Figure 1:
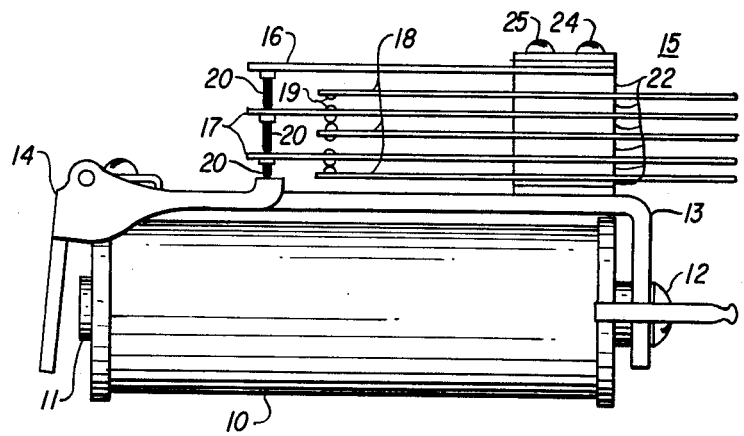

Nov. 10, 1964         W. A. DEPNER         3,156,799
TENSION LOADING ARRANGEMENT FOR SPRING PILEUPS
Filed May 8, 1961

INVENTOR.
William A. Depner
BY
Atty.

United States Patent Office 3,156,799
Patented Nov. 10, 1964

3,156,799
TENSION LOADING ARRANGEMENT FOR SPRING PILEUPS
William A. Depner, Naperville, Ill., assignor to Automatic Electric Laboratories, Inc., Northlake, Ill., a corporation of Delaware
Filed May 8, 1961, Ser. No. 108,627
1 Claim. (Cl. 200—104)

This invention in general relates to switching devices, and more particularly, to spring assemblies of the switching devices.

Spring assemblies of switching devices, for example relays, which are of the multiple spring type having single or twin contacts attached thereto, require individual adjustment for attaining proper contact pressure and in turn optimum operating conditions. Although this method of manufacture produces a satisfactorily performing spring assembly for the most part, there is a tendency of incurring spring distortion at the ends of the contact springs upon individually adjusting the springs, as done for example by sweeping longitudinally over the springs with a duck bill pliers. This results in contact misalignment and additional adjustment of contact spacing. This tendency is substantially eliminated in the case where only one spring of the pileup, for example a tension loading spring, is adjusted to place the remaining springs under proper tension.

In prior art relays the tension of the tensioning spring was transmitted to the remaining springs by a card having a number of slots for carrying the springs. This approach however presents a problem due to wear of the card. Although the slots carrying the springs are initially tight, after numerous operations they begin to show wear and give rise to "floating springs." The eventually result of this condition is erratic opening and closing of the contacts of the springs and possible undesirable arcing. Furthermore, such an arrangement requires a detailed operation for assembling the springs into the slots.

According to the invention the technique of using but one spring to place the other springs under proper tension is significantly improved upon and simplified by the use of individual insulating buffer elements disposed near the end of each movable spring and through the medium of which the tension spring exerts equal force down through all movable springs towards the armature or other actuating element and thus compensates for wear of the buffer elements. Also, the buffer elements may be preassembled to the respective springs prior to pileup assembly and therefore the intricate operation of placing the springs into non-clearance slots of a card is not incurred.

In accord herewith, the primary object of the invention is to provide a spring assembly which can be adjusted with a minimum amount of time and effort.

A second object of the invention is to provide a spring assembly having a minimum number of potential wear areas as well as a self compensating wear feature.

Another object of the invention is to provide a spring assembly which can be assembled in minimum time.

To realize these objects the spring assembly features, in a general way, a contact spring pileup having both non-pretensioned movable or armature springs and stationary springs, and a tensioning spring. Insulating buffers are attached to the tensioning spring and the armature springs in such a manner that the tension or force exerted by the tensioning spring is distributed to the remaining armature springs along an axis common to all of the buffers.

Figure 2:
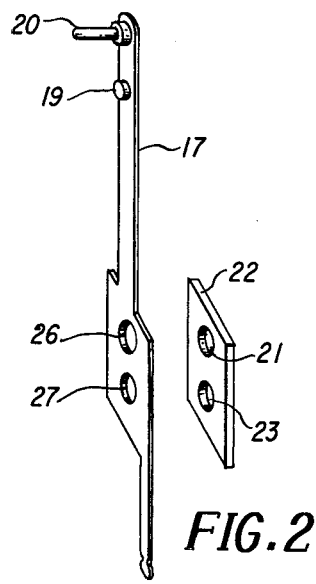

Further objects and features of the invention will become apparent from the following detailed description of an embodiment taken in conjunction with the drawings of which:

FIG. 1 is a side view of a relay including the spring pileup assembly according to the invention, and FIG. 2 is an exploded perspective view of an armature spring and an adjacent insulating spacer of this relay.

Referring now to the drawings, coil 10 is wound on a core 11 which is made of magnetic material and mounted, by means of a screw 12, to the shortest leg of an L-shaped frame, or as commonly known in the art, to the heel end of a heelpiece 13. At the other end of the heelpiece an armature 14 is mounted in a manner such as to magnetically cooperate with the core 11 and engage with the spring assembly 15.

The spring assembly 15 comprises a pileup of; one tensioned loading spring 16 described in more detail hereafter, movable or armature springs 17, and stationary springs 18. Spring 16 on the other hand is placed on top of the pileup and has no contact elements 19 disposed thereon. The contact-carrying springs can be arranged in any desired fashion depending upon whether a "make" or "break" contact operation is desired.

Each spring has two mounting apertures 26 and 27 toward one end thereof and spaced substantially parallel from each other by insulating spacers 22. These substantially rectangular shaped insulating spacers have apertures 21 and 23 which are aligned with the spring apertures so as to permit insertion of screws 24 and 25. These screws 24 and 25 are the means for mounting or securing the pileup 15 to the heelpiece.

The aforementioned loading spring 16, by way of example, conforms to the configuration of the armature springs 17. It does, however, distinguish itself from the armature springs by being either pre-tensioned, for example by a forming operation, or tensioned after assembly with a duck bill pliers. As for the remaining springs of the pileup they are non-pretensioned, that is, they are assembled having no tension or no more tension than that incurred from a normal blanking operation and normally do not require further adjustment. The tension of the tension loading spring 16 is sufficient to place the remaining armature springs 17 under proper tension so as to insure optimum contact element operation. That is, the "make and break" operation which opens and closes corresponding circuits connected to the ends of the springs of the pileup is performed with maximum efficiency. The tensioning technique just described is facilitated in a novel way by using insulating buffers 20 as the intermediary links between the tension loading spring 16 and the armature springs 17.

Buffers 20 are circular shaped with one rounded end and may be mounted to the tension loading spring and to each of the armature springs in any suitable manner, for example, by spot welding, and are positioned substantially at the ends of the springs in such a manner as to fall along a common axis. More particularly one of the buffers is attached to the tension loading spring 16 and extends perpendicularly from the longitudinal axis thereof making physical contact with the adjacent armature spring. The buffer on the adjacent armature spring in turn makes contact with the next armature spring. This arrangement is common for all of the movable or armature springs, and therefore, the buffer attached to the bottom armature spring makes contact with the arm of the armature 14. The effect of this arrangement is that the springs move in a downward direction by virtue of the tension loading spring urging the armature springs toward their normal position and against the armature, and move in an upward direction, against the bias of the tension loading spring, by actuation of the armature. Accordingly, the contacts are either in a "make" or "break" relationship depending upon the direction in which the springs move.

This invention has been described in detail, however, it is understood that the present disclosure has been made only by way of example and numerous changes in the detail and structure may be made without departing from the scope of the invention as hereinafter claimed. For example, the tension of the loading spring may be varied by means of an adjusting screw mounted to an extending screw holding member which is placed in a spaced and parallel relationship to the armature loading spring. In this relationship the adjusting screw can be adjusted relative to the holding member and against the loading spring until a desired amount of tension is achieved.

Also, while in the embodiment shown the tension loading spring 16 is without contacts this spring can itself be an armature spring having them. This latter arrangement would permit a reduction in the number of springs in the pileup. This is advantageous where the height of the pileup is restricted due to space limitation, for example, where the size of the relay is confined to a stipulated size enclosure or cover.

What is claimed is:

An electromagnetic relay comprising an electromagnet with a heelpiece mounted on one end thereof supporting an armature with a movable actuating arm, a spring pileup mounted on said heelpiece comprising a series of movable springs and a series of stationary springs each having contacts cooperating with each other when the movable springs are moved to engage the stationary springs, all of said springs non-pretensioned and mounted together in parallel relation in said pileup, a buffer at the end of each movable spring, said buffers in alignment with each other and with the actuating arm of said armature, a single tensioned spring mounted on said pileup on the outside thereof with the movable springs lying between the tensioned spring and the actuating arm, said tensioned spring also having a buffer in the movable end thereof in alignment with the buffers in said movable springs, the tension in said tensioned spring acting as the sole force to press all of the movable springs toward the actuating arm to normally hold said arm in its unoperated position and maintain all of said buffers in contact with each other as the arm is moved to operate the springs.

References Cited in the file of this patent

UNITED STATES PATENTS

| | | |
|---|---|---|
| 2,541,355 | Graybill et al. | Feb. 13, 1951 |
| 2,735,910 | Dautry | Feb. 21, 1956 |
| 2,970,200 | Walker et al. | Jan. 31, 1961 |

FOREIGN PATENTS

| | | |
|---|---|---|
| 1,053,607 | France | Sept. 30, 1953 |